United States Patent

[11] 3,627,695

[72] Inventor Joseph A. Scarpelli
 Dayton, Ohio
[21] Appl. No. 821,733
[22] Filed May 5, 1969
[45] Patented Dec. 14, 1971
[73] Assignee The National Cash Register Company
 Dayton, Ohio

[54] INSOLUBILIZATION OF GELATIN-CONTAINING FILM BY CITRATE TREATMENT
 12 Claims, 3 Drawing Figs.

[52] U.S. Cl.................................................. 252/316,
 117/62.2, 117/100 A, 260/117, 424/36, 424/37
[51] Int. Cl......................................................... B01j 13/02,
 B44d 1/44, C09h 7/00
[50] Field of Search.......................................... 252/316;
 424/37; 260/117; 117/100 A, 62.2

[56] References Cited
 UNITED STATES PATENTS
2,410,110  10/1946  Taylor.......................... 424/37 X
2,886,445  5/1959  Rosenthal et al. ............ 99/135
3,265,629  8/1966  Jensen........................... 252/316

Primary Examiner—Richard D. Lovering
Attorneys—E. Frank McKinney and Robert J. Shafer ABSTRACT: A treatment process is disclosed for gelatin-containing or proteinaceous capsule wall materials and films wherein the capsules and films which include the proteinaceous materials therein are soaked or steeped in aqueous citrate solutions for extended periods of time. The citrate treatment of this invention serves to harden the capsule wall or film material in such a way as to render it water insoluble. In various embodiments of the treatment, a final capsule or film process step is included, said step differing as to the desired or required intended use of the citrate-treated films or capsule wall material. The treated films or capsule walls can be used without drying, by drying only or by drying only and then subjecting the films or capsule walls to an aging process. The treated films or capsule walls can also be finished by drying and then subjecting them to a desiccation step similar to the aging step but under different conditions.

INSOLUBILIZATION OF GELATIN-CONTAINING FILM BY CITRATE TREATMENT

BACKGROUND OF THE INVENTION

This invention pertains to a method for treating films or capsule walls, wherein the films or capsule walls include a proteinaceous material as at least one component;—gelatin being preferred as that component. It specifically relates to such treatment when capsules are used;—capsule walls being a specialized form of film material. The treatment specifically and especially relates to an en masse treatment of gelatin-containing capsule walls in an aqueous solution;—the aqueous solution containing appreciable amounts of citrate—the object of the treatment being to insolubilize the capsule walls.

1. Field of the Invention

It is often desired or required to insolubilize gelatin films and capsule walls. That is, it is often desired to render them insoluble in aqueous solutions. Old and well-known methods of treating gelatin with aldehydes or with transition metal salts have not always been found adequate or desired, however. The aldehydes discolor gelatin materials and often render them brittle and also may add questionable qualities to the gelatin which cause the gelatin to be considered inedible or otherwise undesirable. Treatment of gelatin films by transition metal solutions always leaves a residue of the transition metal ions, which ions, in many cases, are not desirable or permissible in a finished film or finished capsule product. It is also sometimes found that capsule internal phases, that is, material contained by the capsules, are reactive with aldehydes or transition metals salts used to harden the gelatin materials by the old processes. Sometimes certain film components themselves are reactive with the normally previously used aldehyde and transition metal salt hardeners. The process of this invention teaches a method which, in some cases, can be used to harden gelatin material which could not satisfactorily be hardened by aldehydes or transition metal salts;— the citrate hardening treatment of this invention rendering gelatin capsule wall material relatively water insoluble and yet not discoloring the gelatin, not leaving behind poisonous, inedible or otherwise undesirable capsule wall contaminates, and not reacting with capsule contents or with other film components.

2. Description of the Prior Art

Hardening the proteinaceous components of films by using the aldehydes is well known in the prior art and has been long-published. Specifically, it is well known that aldehydes harden the gelatin in gelatin-containing capsule wall material. For example, in a disclosure specific to capsule wall material, U.S. Pat. No. 2,800,457, issued July 23, 1957 on the application of Barrett K. Green and Lowell Schleicher, discloses a process for chemically hardening capsule walls which capsule walls include a complex of gelatin and gum arabic. The chemical hardening disclosed in that patent is accomplished by the use of formaldehyde.

Moreover, application for U.S. Letters Pat. Ser. No. 586,943, filed Oct. 17, 1966, now 586,943, Pat. No. 3,576,758 in the name of Donald D. Emrick and assigned to the assignee herein, disclosed chemically hardening of the gelatin-containing capsule wall material using aqueous solutions of transition metal salts.

Although not related to the water insolubilization of gelatin-containing film or gelatin-containing capsule walls, an article titled Citrate-Promoted Helix Formation in Gelatin and subtitled The Viscosity-Time Effect, published in the Biochemical Journal, Volume 83, Page 124 (1962). and authored by A. Courts, discloses chemical interaction of citrate with gelatin in dilute aqueous solution. The interaction of gelatin with citrate ion in aqueous solution is shown therein to result in an increase of viscosity of the solution, over relatively short periods of time. It should be understood that the gelatin solutions utilized in experiments described in the article are very low in concentration and that the above-described article certainly does not disclose insolubilization of gelatin-containing films.

In application for U.S. Letters Pat. Ser. No. 710,725, filed Mar. 6, 1968, in the name of Joseph A. Scarpelli and assigned to the assignee herein, there was disclosure that gelatin-containing capsule wall materials could be treated with certain salts in order to render them self-sustaining, isolatable, and yet water soluble. One of the salts disclosed as eligible for use in the novel treatment of that invention was sodium citrate. The contact time of gelatin-containing capsules with aqueous sodium citrate solution in the treatment disclosed in that patent application, however, was relatively short, that is, in the order of less than a day or two. The contact time for gelatin-containing capsule walls and citrate solution in the present treatment of this invention will be found to be more than about 2 days; and, in some cases, several days when special after-steps are not practiced.

SUMMARY OF THE INVENTION

It has been discovered, and will be disclosed herein, that gelatin-containing films and capsule wall materials can be treated with certain aqueous citrate solutions in order to render the gelatin relatively water insoluble. As has been previously discussed, it is often an object of capsule wall treatment to insolubilize capsule walls in order that capsules might better contain the intended internal phase material when dispersed in water or when in contact with water or a high relative humidity condition. Also, as has been previously discussed, traditionally or historically used treatments of proteinaceous materials by reaction with aldehydes or transition metal salts, are not always adequate and do not always result in a satisfactory capsule product.

The insolubilizing treatment of this invention includes, simply, the immersion of preformed capsules having walls including water soluble, gelatin-containing material in an aqueous solution of a citrate ion having a certain concentration wherein the aqueous solution has a particular pH and, further, wherein the immersion continues for a duration of some certain specified time. That step of immersion can be followed, if desired or required, by an after-step of drying the film and, further, by an after-step of aging the film in either dry or desiccated environment or in normal, so-called, ambient or room temperature, conditions. These after-steps of drying and aging or desiccating will be seen, in later disclosure herein, to modify the effect obtained by the novel treatment. These additional steps enhance the insolubilizing effect to a greater or lesser extent and can be applied as desired or required to obtain particular or specific capsule product characteristics.

An object of the present invention is to provide a treatment process for rendering gelatin-containing films relatively insoluble in water and in aqueous solutions.

Another, more specific, object of the present invention is to provide such insolubilizing treatment for the gelatin-containing material of the walls of minute capsules.

Another object of the present invention is to provide treatment of gelatin-containing film and gelatin-containing capsule wall material by a treatment utilizing citrate ions in aqueous solution;—such treatment rendering the gelatin portion of the film or capsule wall material relatively water insoluble. As mentioned previously, the normal process of this invention includes, in general, the immersion of gelatin-containing film in an aqueous solution—specifically in an aqueous solution of a citrate salt. The immersing step can be followed by any one of several alternative finishing or after-steps which have been mentioned previously hereinabove. The finishing steps are, in some cases, important, novel, and yield a capsule product with surprising and unexpectedly superior characteristics, measured in terms of capsule wall impermeability to loss by diffusion through the walls coupled with relative water insolubility.

A remarkable aspect of the present invention and one of the features which is believed to lend patentability to the present invention, resides in the extended immersion time required for complete treatment of gelatin-containing film and of capsule walls. It was entirely surprising and unexpected that immersion of gelatin-containing films in aqueous solutions of citrate ion, for extended periods of time, would result in insolubilization of the films being treated.

Although the extended duration of immersion greatly increases processing costs in the manufacture of capsules, such increase in manufacturing costs are acceptable or can be deemed necessary in instances wherein the benefits to be realized from such treatment are essential or considered to be worthwhile. Also, it will be disclosed hereinbelow that in certain embodiments of the present invention, wherein dried, treated, capsule walls are aged in a desiccating environment, the required duration of immersion time is much decreased; and, in some cases, might be as low as a single day or two.

Among films, capsules, and capsule wall materials, which are eligible for use in the treatment of this invention are included any gelatin-containing films or capsule wall materials. Of course, the words "gelatin containing" include films and capsule walls of a simple combination of gelatin and other materials, of gelating alone, or of gelatin complexed with other material. The films wherein gelatin is complexed with other materials, is sometimes formed from a process known as complex-coacervation and the film is sometimes named a complex-coacervate film even in the dried form. Such is the common makeup of the capsule wall material to be treated by the process of this invention;—the capsule walls to be treated being formed by the process of complex-coacervation and then dried. The capsule wall material preferred for treatment is a complex of gelatin as a positively charged hydrophilic polymeric material and a negatively charged hydrophilic polymeric material. A common example of such negatively charged material is gum arabic or partially or fully hydrolyzed poly(ethylene-co-maleic anhydride).

Of course, if the films are layered or if the capsule walls consist of concentric layers of materials any of the layers which include gelatin or gelatin-containing material will be insolubilized by the treatment of the present invention. Other non-gelatin-containing layers of the film or the capsule wall material will not be appreciably affected by this treatment. As mentioned previously, the preferred practice of this invention includes the treatment of preformed capsule walls wherein the capsule wall material includes at least one gelatin component. In the novel treatment of the capsule wall materials, any commonly used kind of gelatin can be treated and any size of capsule can be treated. The size of capsules usually treated by the process of this invention extend in a range from about a few microns up to several thousand microns;—a preferred range being from about 15 microns up to about 1,500 microns or perhaps slightly larger.

As to the contents of the capsules to be treated by the process of this invention, capsules containing any material which is not adversely affected by the citrate solution at the pH of the treatment or which is not adversely affected by the citrate ion itself can be used. If, in some cases wherein there is a slight interaction or chemical reaction between the citrate ion and the encapsulated internal contents, the treatment of the present invention can be used anyway, if the chemical interaction or chemical reaction is not considered to be of a degree which renders the capsules unusable.

As mentioned previously, relatively long times are required for accomplishing the capsule wall treatment process of the present invention. The duration of immersion of the capsule wall material in citrate solution can be varied and controlled by several other parameters of the treating system. The duration of immersion has been found to be dependent upon and to vary with, for example, pH of the treatment solution, concentration of citrate ion in the solution, temperature of the solution, and, of course, the degree of insolubilization desired as a final characteristic of the film or capsule wall material. The duration for immersion of the capsule wall material to be treated is also dependent upon the time and type of aging or desiccating process to be applied to the treated capsules after the immersion.

It has been found, in general, that from 2 days to as many as 60 or more days can be required to complete treatment of the gelatin-containing capsule wall material including the final step of aging of that wall material. The lower extreme of 2 days can be used when a desiccating final step is applied to the treated capsule wall material wherein the capsules are aged in an environment having a relative humidity of from less than about 5 percent to as high as 20 or 30 percent. Such will be described below. The upper extreme of 60 days or more of immersion of the capsule wall material may be required when the capsule wall material is not to be dried after the immersion treatment in citrate solution. In that case the 60 days may be required in order to insolubilize the capsule wall material which will not have a chance to age in its dry or desiccated form.

Although treatment of the capsule wall material can be accomplished in a treatment solution having a temperature below that at which the capsule wall material dissolves or melts, it has been found that the colder the treatment solution, the faster the citrate-insolubilization treatment occurs. Reason for this temperature relation to insolubilization rate is not completely understood. For convenience, the process of this invention is usually conducted at room temperature which is about 25 degrees centigrade but if such would be required or desired for some purpose, the process could be more effectively conducted at much lower temperatures, for example, at about 0° C. or could be conducted at considerably higher temperatures such as 35° C.

The pH of the aqueous citrate treatment solution can extend in a range of from about 4 to about 10 or perhaps slightly outside that range;—the preferred treatment range being from about pH 6 to about pH 9. The most preferred pH of the aqueous treatment solution is about 8.

Concentration of citrate ion in the aqueous treatment solution can extend from about ¼ molar up to saturation which concentration range corresponds to about 47 grams of citrate ion per liter of treatment solution up to approximately 470 grams of citrate ion per liter of saturated treatment solution at about 25° C. for sodium citrate salt. Of course, the concentration of the saturated solution is dependent upon temperature of the treatment solution and kind of citrate salt used.

As has been pointed out, particularly in the previously cited application for U.S. Letters Pat. Ser. No. 710,725, proteinaceous materials are shrunken by immersion in aqueous solutions of sufficient ionic strength while those same materials are swollen or even dissolved by aqueous solutions of low ionic strength.

It appears that the capsule wall material to be treated by the of this invention must be immersed in an aqueous solution which contains a insolubilization concentration of salt that the gelatin-containing material assumes a shrunken condition. In an aqueous solution which contains substantially only a citrate salt below a concentration of insolubilization. ¼ molar, the capsule walls and the gelatin of the capsule wall material is not in a shrinking solution and, in fact, is swollen. Therefore, any gelatin insolubilization which could be accomplished in that low citrate ion concentration would not act to the benefit of the desired capsule characteristics of impermeability and capsule wall insolubilization. Of course, a combination of salts can be used; such as, for instance, a combination of sodium sulfate and sodium citrate, in order to raise the concentration of ions (ionic strength) to the point where the treatment solution will shrink the gelatin-containing capsule wall material rather than swell it. Of course, the citrate ion;—being in a reduced concentration, will be, to that degree, less effective in accomplishing the insolubilization treatment of this invention. To the degree that the citrate ion is present, to that degree the insolubilization will occur. It is believed that the citrate ion is unique in affecting the insolubilization process of this invention and, therefore, that any water soluble citrate salt can be used in the process of this invention. Several other salts have been used in attempting insolubilization of gelatin-containing capsule walls but salts other than citrate salts have not been found to be effective. A few of those other salts tested on complex-coacervate capsule wall films containing gelatin are as follows: magnesium sulfate, sodium sulfate, sodium tartrate, ammonium sulfate, sodium chloride, and sodium acetate. None of those salts were found to insolubilize the capsule wall material. The metes and bounds of the process of this invention will be extensively and completely discussed in the examples which occur hereinbelow.

It should be noted that another remarkable feature of the process of this invention includes what has been called the desiccator treatment wherein the capsule wall material which has been immersed or which has undergone the immersion treatment in the aqueous citrate solution is placed in a desiccated environment for a period of what is believed to amount to an enforced aging treatment. The citrate ion-immersed capsule wall material, after being dried, undergoes extremely unexpected changes in an increase in the rate of insolubilization, with the length of time that the capsule wall material is subjected to the desiccating environment. As will be shown, the effectiveness of the desiccating after-treatment is more than 100 times greater than the effectiveness of aging the dried, immersed, capsule wall material at what are called ambient conditions, that is, approximately 50 percent relative humidity and approximately 20 to 25 degrees centigrade. That magnitude of 100 times more effective is measured as a function of the time required to dissolve the treated and aged film.

All of the figures are graphs. All of the figures depict the time required for treated, gelatin containing, capsule walls to go into solution as a function of the time or duration of treatment or as a function of the duration of the after-step of drying or desiccating the treated capsule walls. All of the graphs have been constructed from experimental data generated during completion of the present invention. The data is included herein as a portion of the description of preferred embodiments of the invention. The capsules which were used in construction of the graphs of FIGS. 1, 2, and 3 contained mineral oil as an internal phase and had capsules walls which consisted of a complex of gelatin and other negative hydrophilic polymeric materials. The capsules were made according to a process similar to that disclosed in U.S. Pat. No. 3,341,466, issued Sept. 12, 1967, on the application of Carl Brynko, et al. and were about 200 microns to about 500 microns in average diameter.

FIG. 1 is a representation of a so-called 27-day treatment, which is more fully explained hereinbelow in example 2. The abscissa of the graph represents the duration of immersion, in days, of the capsule wall material in a 1 molar sodium citrate solution buffered at a pH of 8 and maintained at a temperature of approximately 25° C. The ordinate of the graph represents the minutes required to dissolve capsule wall material in water maintained at a temperature of approximately 50° C. The treatment is identified as a 27-day treatment because capsules treated according to the process represented by FIG. 1 were subjected to a soaking time and an aging time having a total of 27 days. The aging was performed in ambient conditions, that is, approximately 50 percent relative humidity and approximately 25° C. It should be noted that after approximately 4 days of soaking time the treated capsule wall material begins to become insolubilized. That rate of insolubilization is approximately constant up to about the 16th day of soaking time whereafter, the rate of insolubilization increases rapidly, as the soaking time approaches the total of the 27 day period.

FIG. 2 represents another method for presenting the data taken from the same example used to construct the graph of FIG. 1 before, that is, example 2. In FIG. 2, the abscissa represents the days of aging time wherein the conditions for aging are approximately 50 percent relative humidity and approximately 25° C. The ordinate represents the logarithm of time, in minutes, required for dissolving the treated gelatin-containing capsule wall material. It is apparent that there is a rather complex interaction between the soaking time and the aging time in the process of this invention and in the resulting insolubilized gelatin-containing capsule wall product. The graph of FIG. 2 shows, in part, that one day of soaking in the 1 molar sodium citrate solution produces substantially no insolubilization despite continued aging. On the other hand, when the capsule wall material is soaked for a longer duration, for example, for 17 days, the insolubilizing effect is increased as a function of aging. In the case where the capsule walls were soaked for 38 days, a slope, in the graph, indicating the rate of insolubilization with aging time is even higher than that of the 17-day soaking curve. It can be concluded that an interaction exists between soaking in the citrate treatment solution and duration of aging in ambient environmental conditions. The longer the duration of soaking, the more rapid the rate of insolubilization.

FIG. 3 is also a graph and the data used to construct the graph of FIG. 3 was obtained from the experiment described in example 3 hereinbelow. The abscissa of the graph of FIG. 3 is a measure of duration, in days, of aging by either drying in ambient conditions or aging by desiccating in extremely dry conditions. The ordinate represents logarithm of the time, in minutes, for the treated capsule walls to dissolve in a water bath at approximately 50° C. There are three curves in FIG. 3 and they are intended to depict the remarkable increase in rate of insolubilization when the aging of treated capsule wall material is performed in a desiccating environment as opposed to aging in an environment of simply ambient conditions. It is apparent from the graph that capsule wall material which has been immersed in treatment solution for 7 days and then simply dried and aged for from 1 to 3 days in ambient conditions, undergoes no remarkably increased insolubilization, during the time of aging by simple drying. The capsules which underwent the 7 day immersion period and which were then aged in a desiccator, however, can be seen to have undergone an increase of over 50 times in insolubilization over a period of aging from 1 day to 3 days. It can also be seen that, with a reduced immersion duration of from 7 to 4 days, and in increased desiccator aging duration of from 4 days to 6 days, the degree of insolubilization is greatly increased over what would have been expected had the aging taken place under ambient conditions.

DESCRIPTION OF PREFERRED EMBODIMENTS

Example 1

In this example a gelatin-containing film was treated by the process of the invention. A film of a complex of gelatin and gum arabic, was prepared, by combining 180 grams of an 11 percent, by weight, gelatin solution, 180 grams of an 11 percent, by weight, gum arabic solution, and 500 milliliters of water, all at a temperature of about 55° C. The gelatin used was acid-extracted pigskin gelatin having an iso-electric point of approximately pH 8 to 9 and a Bloom strength of approximately 285 to 305 grams. On combination of the above-described materials, the complex-coacervate formed, which coacervate is a complex combination of gelatin and gum arabic. That complex coacervate, being denser than the remaining aqueous solution, settled to the bottom of the vessel. The remaining aqueous solution was decanted and the coacervate material was poured into trays to form films of gelatin-containing polymeric material. The films or sheets were manufactured by drying the cast coacervate film. When the films were dried, they were immersed in a 1 molar solution sodium citrate and permitted to soak for a period of 2 months. A portion of the films isolated from sodium citrate solution after the immersion period of 2 months, was found to remain intact, that is, not dissolve after 3 days in water maintained at a temperature of about 50° C. Another sample of the immersed film was placed in boiling water and it was found that 1 hour in the boiling water was required to disintegrate film. After that 1 hour of immersion in boiling water, a portion of treated film was still not dissolved. It should be pointed out that the gelatin-containing complex coacervate film in the absence of the sodium citrate insolubilization treatment of this invention, would easily and rapidly dissolve in water maintained at a temperature of 50° C.

Example 2

Figure 1:
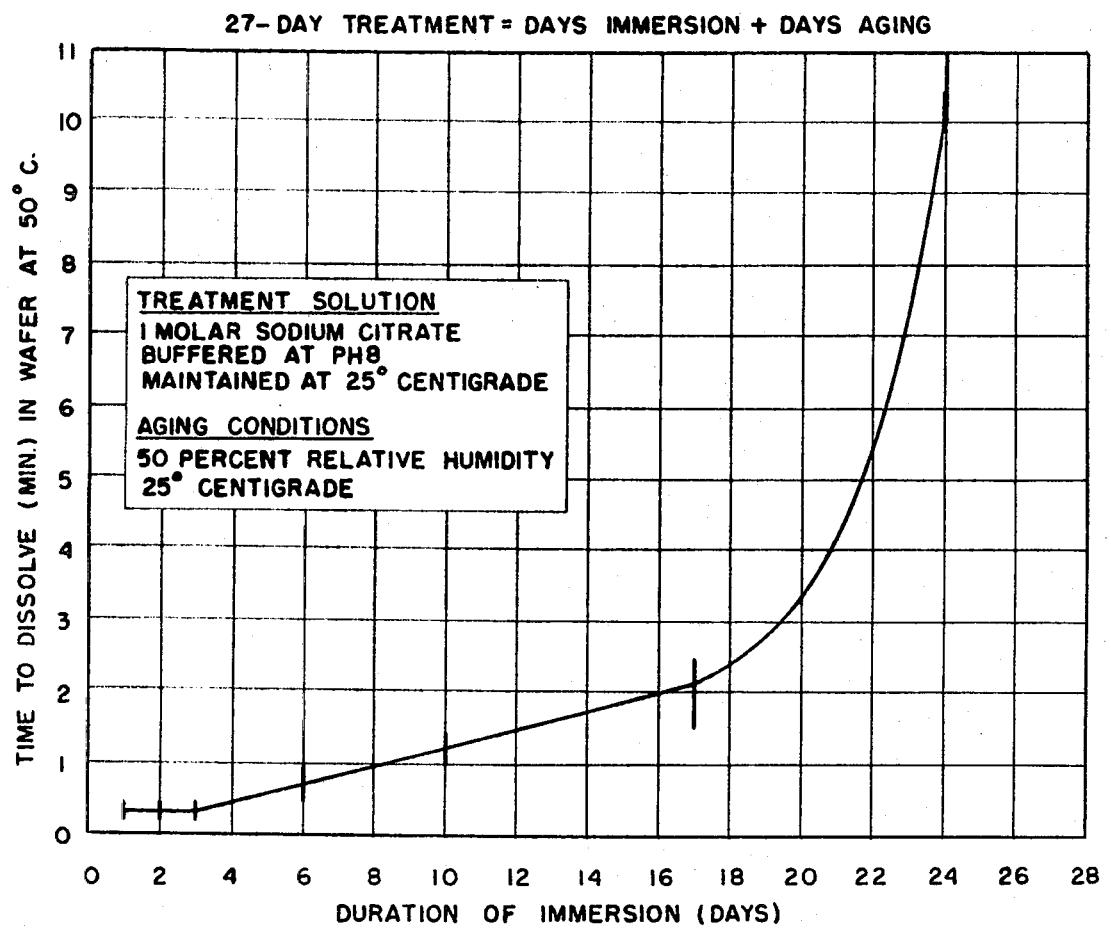
Figure 2:
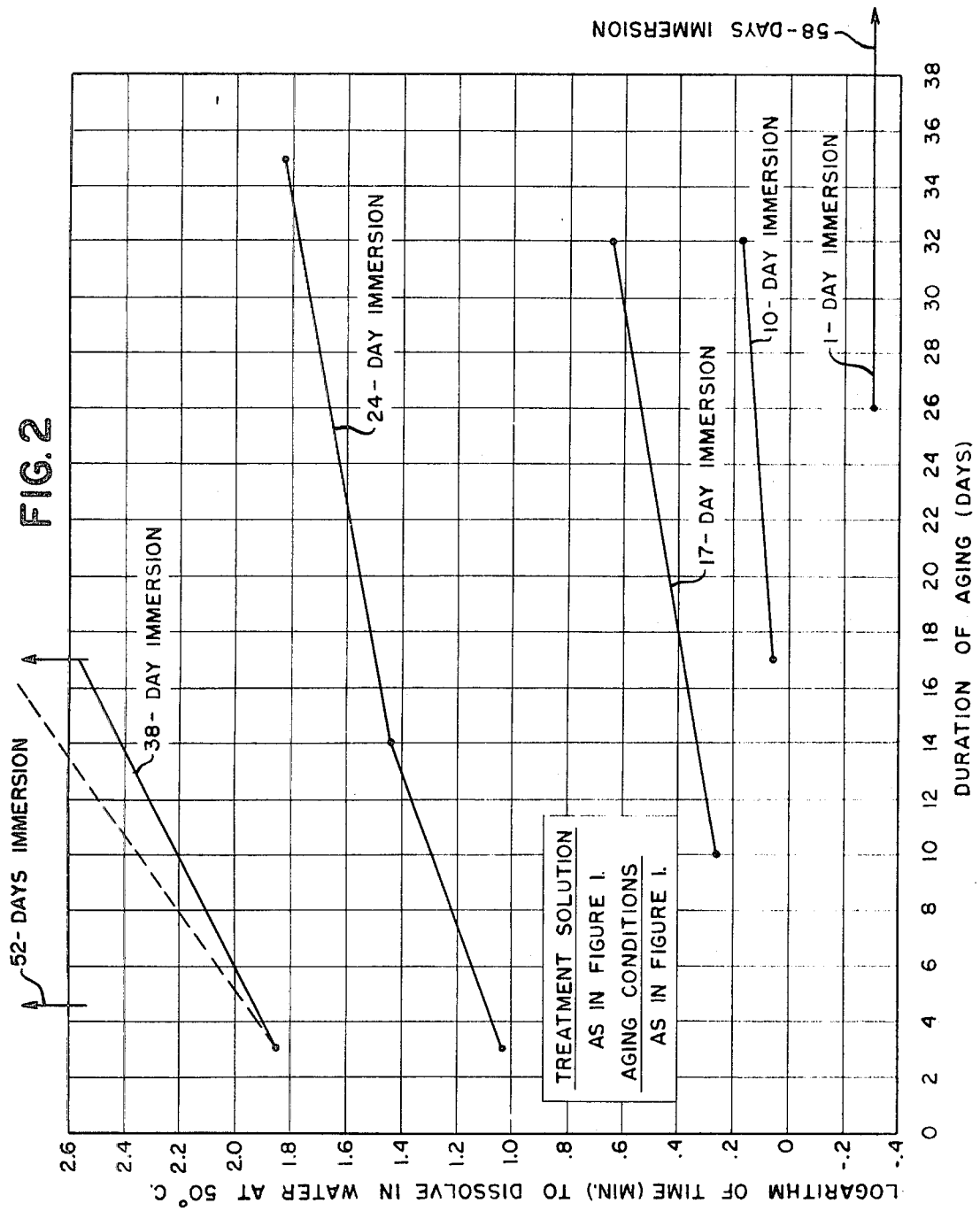
Figure 3:
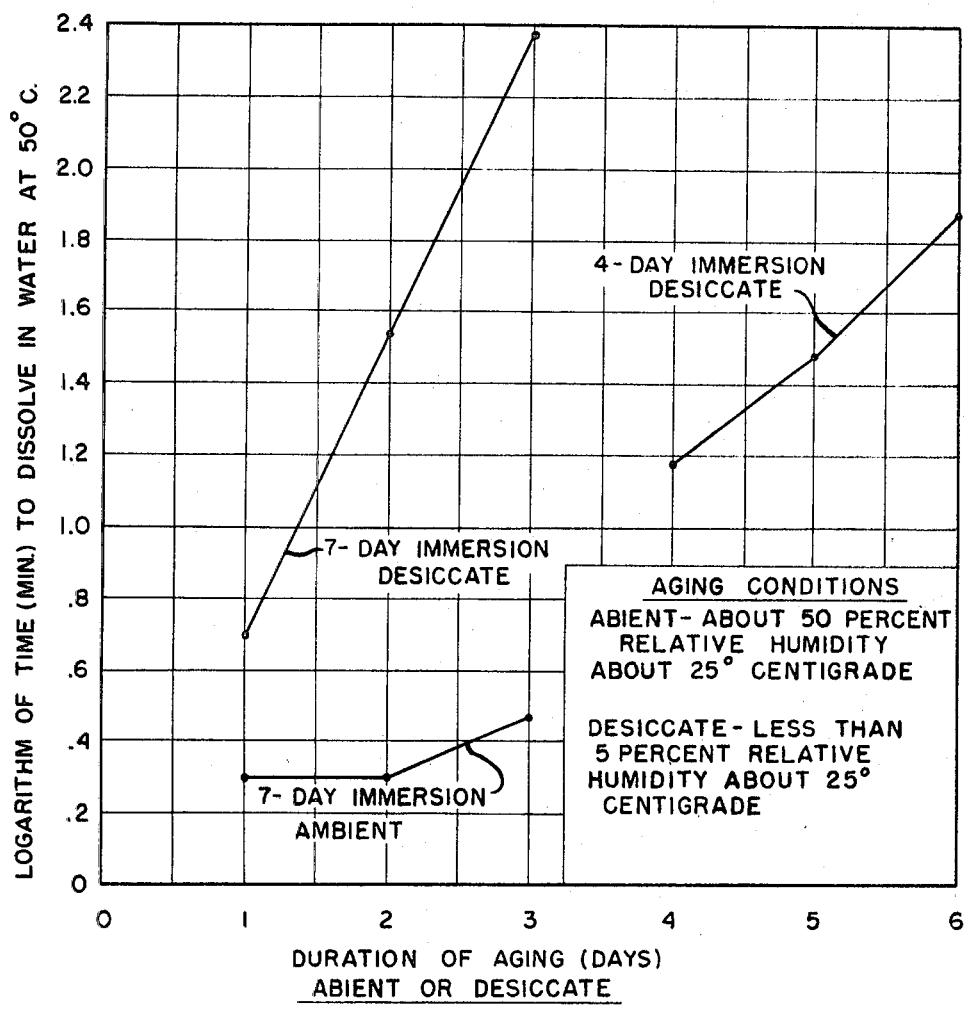

As has been aforementioned, FIGS. 1 and 2 were constructed from data generated in this example 2. In this example, mineral oil-containing capsules having walls of a complex combination of gelating and gum arabic were treated by being immersed in 1 molar aqueous solution of sodium citrate buffered at about pH 8 and maintained at a temperature of approximately 25° C. for the time durations which will be indicated in the table below. The table consists of columns which read, from left to right, as follows: the first column identifies individual samples by letter; the second column indicates duration of immersion in the sodium citrate solution, in days; the third column indicates aging time in days, (The condition of aging was approximately 50 percent relative humidity and approximately 25° C.); the next column indicates the time, in minutes, that was required for dissolving the treated capsule wall material in a water bath maintained at approximately 50° C., the next column provides indication of additional aging under the same conditions; and the next column is, again, the time required for solution of the capsule wall material in water at 50° C.

| Sample | Immersion Time (Days) | Aging Time (Days) | Time to Dissolve (Min.) | Add. Aging Time (Days) | Time to Dissolve (Min.) |
|---|---|---|---|---|---|
| A | 1 | 26 | ¼ to ½ | 32 | ¼ to ½ |
| B | 2 | 25 | ¼ to ½ | — | — |
| C | 3 | 24 | ¼ to ½ | — | — |
| D | 6 | 21 | ½ to 1 | — | — |
| E | 10 | 17 | 1 to 1½ | 15 | 1¼ to 1¾ |
| F | 17 | 10 | 1½ to 2½ | 22 | 4 to 5 |
| G | 24 | 3 | 10 to 11 | | 26 to 30* |
| H | 38 | 3 | 70 to 73 | 14 | Greater than 360 |
| I | 52 | 7 | Greater than 360 | — | — |

*Then after additional 21 days was 63 to 70 minutes.

EXAMPLE 3

In this example, capsules of the same kind which were used in example 2 were steeped in a one molar sodium citrate solution for different periods of time as indicated in the tables below and were then aged for different periods of time, also as indicated below, either in ambient conditions which have been hereinabove defined or in desiccated conditions. The so-called desiccated conditions include a relative humidity of less than about 5 percent and a temperature of approximately 25° C. The desiccator used in these tests was an ordinary laboratory vessel containing, in the bottom compartment, anhydrous calcium sulfate as the water absorbent material. A vacuum was not drawn on the desiccating apparatus. Dissolving times indicated in the tables below indicate the approximate amount of time required for dissolving the insolubilized capsule wall material in water maintained at 50° C.

| Immersion Time (Days) Citrate Steep | Aging — Duration (Days) and Conditions | Time (Min.) Required for Dissolving |
|---|---|---|

EIGHT-DAY TEST

| | | |
|---|---|---|
| 7 days | 1 day, ambient | Less than 2 min. |
| 7 days | 1 day, desiccator | About 5 min. |
| 4 days | 4 days, desiccator | About 15 min. |

NINE-DAY TEST

| | | |
|---|---|---|
| 7 days | 2 days, ambient | Less than 2 min. |
| 7 days | 2 days, desiccator | 30 to 35 min. |
| 4 days | 5 days, desiccator | About 30 min. |

TEN-DAY TEST

| | | |
|---|---|---|
| 7 days | 3 days, ambient | Less than 3 min. |
| 7 days | 3 days, desiccator | More than 240 min. |
| 4 days | 6 days, desiccator | About 75 min. |

TWENTY-TWO-DAY TEST

| | | |
|---|---|---|
| 11 days | 11 days, ambient | 7 to 10 min. |
| 11 days | 11 days, desiccator | About 240 min. |
| 11 days | 11 days, aged 50° C. in an oven | 7 to 10 min. |

EXAMPLE 4

A sample of the same kind of capsules utilized in the above examples was immersed in a one molar sodium citrate solution at a buffered pH of about 8 at an approximate temperature of 25° C. for 66 days. The capsules were isolated and aged in ambient conditions for 6 days and were then aged in a desiccator for 14 days. Those treated capsules walls required 30 minutes in boiling water to dissolve. It should be pointed out that those same capsules without the sodium citrate treatment of this invention with or without the aging and ambient condition and desiccator conditions, almost instantaneously dissolved in boiling water. It can be seen, therefore, that the treatment of the present invention to a great degree insolubilizes the gelatin-containing capsule walls.

Example 5

This example was performed in order to demonstrate pH dependency with regard to dissolving the citrate treated capsule wall material of this invention. Capsules treated by the citrate insolubilizing solution were placed in water baths maintained at about 50° C. at three different pH levels. The first water bath was maintained at a pH of about 3 and the capsule walls dissolved in about 1 hour. The second water bath was maintained at the pH of about 7. The capsule walls again dissolved in about 1 hour. The third water bath was maintained at an alkaline pH of about 12 and the capsule walls dissolved in less than 2 minutes. It can be seen, therefore, that the insolubilizing treatment of this invention has no appreciable effect on the solution characteristics of treated capsule wall material in strongly alkaline conditions.

Example 6

In treatment tests wherein capsules were immersed in sodium citrate solution buffered at different pH levels, it was found that among baths buffered at pH 4.5, 6, 7, and 8, the bath buffered at pH 8 performed the most effectively in the insolubilizing treatment and yielded the most impermeable and water-insoluble capsule walls, in the dried capsule product.

What is claimed is:

1. A process for insolubilizing water soluble proteinaceous film comprising the steps of:
   a. immersing the water soluble proteinaceous film in an aqueous solution having a concentration of citrate ion greater than about ¼ molar, and a pH between about 4 and 10 for a duration of greater than about 4 days; and
   b. drying the film and aging it in an environment having about 0 to 80 percent relative humidity and about 0° to 35° C. for a duration of greater than about 2 days.

2. The process of claim 1 wherein the proteinaceous film comprises gelatin.

3. The process of claim 1 wherein the proteinaceous film is a capsule wall.

4. A process for rendering water soluble proteinaceous film, relatively water insoluble comprising the steps of:
   a. immersing the water soluble proteinaceous film in an aqueous solution having a concentration of citrate ion greater than about ¼ molar, and a pH between about 4 and 10 for a duration of greater than about 2 days; and
   b. drying the film and aging it in a desiccating environment having less than about 20 percent relative humidity and about 0° to 35° C. for a duration of greater than about 2 days.

5. The process of claim 4 wherein the proteinaceous film comprises gelatin.

6. The process of claim 4 wherein the proteinaceous film is a capsule wall.

7. A process for rendering water soluble gelatin-containing film, relatively water insoluble comprising the step of immersing the water soluble gelatin-containing film in an aqueous solution having a concentration of citrate ion greater than about ¼ molar, and a pH between about 4 and 10 for a duration of greater than about 15 days.

8. The process of claim 7 wherein the proteinaceous film comprises gelatin.

9. The process of claim 7 wherein the proteinaceous film is a capsule wall.

10. A process for rendering water soluble proteinaceous capsule wall material relatively water insoluble comprising the step of immersing the capsule wall material in an aqueous treatment solution having a concentration of citrate ion greater than about ¼ molar, and a pH between about 4 and 10 for a duration of greater than about 15 days.

11. The process of claim 10 wherein the proteinaceous material comprises gelatin.

12. The process of claim 10 wherein there is the additional step of drying the film and aging it in an environment having less than about 80 percent relative humidity and less than about 35° C.

* * * * *